United States Patent
Ludin et al.

(10) Patent No.: US 10,207,788 B2
(45) Date of Patent: Feb. 19, 2019

(54) STRUCTURE HAVING JOINED UNITARY STRUCTURES

(71) Applicant: The Boeing Company, Chicago, IL (US)

(72) Inventors: Douglas Reinhard Ludin, Malvern, PA (US); Michael Joseph DeLuca, Bryn Mawr, PA (US); Peter Holemans, Sewell, NJ (US)

(73) Assignee: The Boeing Company, Chicago, IL (US)

( * ) Notice: Subject to any disclaimer, the term of this patent is extended or adjusted under 35 U.S.C. 154(b) by 129 days.

(21) Appl. No.: 15/096,694

(22) Filed: Apr. 12, 2016

(65) Prior Publication Data

US 2017/0291679 A1  Oct. 12, 2017

(51) Int. Cl.
*B64C 1/06* (2006.01)
*B64C 1/12* (2006.01)
(Continued)

(52) U.S. Cl.
CPC ............... *B64C 1/12* (2013.01); *B29C 65/48* (2013.01); *B29C 65/7805* (2013.01); *B29C 66/02241* (2013.01); *B29C 66/112* (2013.01); *B29C 66/1222* (2013.01); *B29C 66/12441* (2013.01); *B29C 66/12443* (2013.01); *B29C 66/131* (2013.01); *B29C 66/301* (2013.01); *B29C 66/54* (2013.01); *B29C 66/721* (2013.01); *B29C 66/97* (2013.01); *B29C 70/42* (2013.01); *B29D 99/0014* (2013.01); *B64C 1/064* (2013.01); *B64C 3/182* (2013.01); *B64C 3/26* (2013.01);

(Continued)

(58) Field of Classification Search
CPC ... B64C 1/12; B64C 2001/0072; B64C 1/064; B64C 3/182; B64C 3/26; B29K 2105/08; B29L 2031/3082; B29L 2031/3076; B29D 99/0014; B29C 65/7805; B29C 2793/009; B29C 70/42; B29C 65/48; B29C 66/721; B29C 66/1222; B29C 66/12443; B29C 66/02241; B29C 66/112; B29C 66/12441; B29C 66/131; B29C 66/301; B29C 66/54; B29C 66/97; B64F 5/00
See application file for complete search history.

(56) References Cited

U.S. PATENT DOCUMENTS 4,713,924 A  12/1987  Toti
5,476,704 A  12/1995  Kohler
(Continued)

FOREIGN PATENT DOCUMENTS

| EP | 1364770 A1 | 11/2003 |
|---|---|---|
| WO | WO9518013 A1 | 7/1995 |
| WO | WO2008020158 A2 | 2/2008 |

OTHER PUBLICATIONS

Extended European Search Report, dated Sep. 12, 2017, regarding Application No. 17165788.5, 9 pages.

*Primary Examiner* — Assres H Woldemaryam
(74) *Attorney, Agent, or Firm* — Yee & Associates, P.C.

(57) ABSTRACT

A method and apparatus are presented. The apparatus comprises a first unitary structure, a second unitary structure, and a number of joints between the first unitary structure and the second unitary structure. The first unitary structure has a plurality of T-shaped cross-sections. The second unitary structure has a plurality of T-shaped cross-sections.

18 Claims, 11 Drawing Sheets

(51) Int. Cl.
  *B64F 5/00* (2017.01)
  *B29C 70/42* (2006.01)
  *B29C 65/48* (2006.01)
  *B29C 65/00* (2006.01)
  *B29D 99/00* (2010.01)
  *B64C 3/18* (2006.01)
  *B64C 3/26* (2006.01)
  *B29C 65/78* (2006.01)
  *B64C 1/00* (2006.01)
  *B29K 105/08* (2006.01)
  *B29L 31/30* (2006.01)

(52) U.S. Cl.
  CPC ...... *B64F 5/0009* (2013.01); *B29C 2793/009* (2013.01); *B29K 2105/08* (2013.01); *B29L 2031/3076* (2013.01); *B29L 2031/3082* (2013.01); *B64C 2001/0072* (2013.01); *Y02T 50/43* (2013.01)

(56) References Cited

U.S. PATENT DOCUMENTS

| | | | |
|---|---|---|---|
| 5,487,930 A * | 1/1996 | Lockshaw | B32B 3/12 428/53 |
| 5,817,269 A | 10/1998 | Younie et al. | |
| 7,686,908 B2 | 3/2010 | Misciagna et al. | |
| 8,276,848 B2 * | 10/2012 | Zuniga Sagredo | B64C 3/18 244/123.1 |
| 8,511,360 B2 | 8/2013 | Misciagna et al. | |
| 8,851,422 B2 | 10/2014 | Dan-Jumbo | |
| 2001/0051251 A1 * | 12/2001 | Noda | B32B 3/18 428/119 |
| 2003/0218267 A1 * | 11/2003 | Husmann | B29C 70/443 264/101 |
| 2004/0140049 A1 * | 7/2004 | Puriefoy | B29C 37/0075 156/212 |
| 2005/0127576 A1 * | 6/2005 | Menendez | B29C 37/005 264/510 |
| 2009/0283638 A1 * | 11/2009 | Arevalo Rodriguez | B29D 99/0014 244/119 |
| 2010/0230542 A1 * | 9/2010 | Childs | B64C 3/182 244/123.1 |
| 2011/0186683 A1 * | 8/2011 | Lonsdorfer | B29C 70/30 244/119 |
| 2012/0121854 A1 * | 5/2012 | Yoshida | B64C 1/061 428/137 |
| 2014/0186572 A1 * | 7/2014 | Arevalo Rodriguez | B64C 1/064 428/99 |
| 2014/0376995 A1 * | 12/2014 | Faass | F16B 11/008 403/267 |
| 2015/0336368 A1 | 11/2015 | Ross | |
| 2016/0304187 A1 * | 10/2016 | Autry | B29C 70/342 |

\* cited by examiner

STRUCTURE HAVING JOINED UNITARY STRUCTURES

BACKGROUND INFORMATION

1. Field

The present disclosure relates generally to structures, and in particular, to forming structures with I-shaped cross-sections. More particularly, the present disclosure relates to forming composite structures by joining unitary structures.

2. Background

Aircraft are being designed and manufactured with greater and greater percentages of composite materials. Composite materials are used in aircraft to decrease the weight of the aircraft. This decreased weight improves performance features, such as payload capacities and fuel efficiencies. Further, composite materials provide longer service life for various components in an aircraft.

Composite materials are tough, light-weight materials created by combining two or more functional components. For example, a composite material may include reinforcing fibers bound in a polymer resin matrix. The fibers may be unidirectional or may take the form of a woven cloth or fabric. The fibers and resins are arranged and cured to form a composite material.

Further, using composite materials to create aerospace composite structures potentially allows for portions of an aircraft to be manufactured in larger pieces or sections. For example, a fuselage in an aircraft may be created in cylindrical sections and then assembled to form the fuselage of the aircraft. Other examples include, without limitation, wing sections joined to form a wing or stabilizer sections joined to form a stabilizer.

Aircraft include stiffeners, such as I-beams. In some implementations, the stiffeners are arranged into a grid. When formed of composite materials, each stiffener would traditionally be cured prior to being fastened to other stiffeners in the grid. Curing each stiffener individually may use at least one of an undesirable amount of time or an undesirable amount of resources. Further, fastening stiffeners increases the weight of the resulting aircraft. Therefore, it would be desirable to have a method and apparatus that take into account at least some of the issues discussed above, as well as other possible issues.

SUMMARY

In one illustrative embodiment, an apparatus is presented. The apparatus comprises a first unitary structure, a second unitary structure, and a number of joints between the first unitary structure and the second unitary structure. The first unitary structure has a plurality of T-shaped cross-sections. The second unitary structure has a plurality of T-shaped cross-sections.

Another embodiment of the present disclosure provides a method. A first unitary structure having a plurality of T-shaped cross-sections is formed. A composite skin bonded to a second unitary structure having a plurality of T-shaped cross-sections is formed. A number of joints between the first unitary structure and the second unitary structure is formed.

Yet another embodiment of the present disclosure provides a method. A first plurality of T-shaped stiffeners are co-cured to form a first grid. A second plurality of T-shaped stiffeners are co-cured to form a second grid. A number of joints is formed between the first grid and the second grid.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that unitized composite grids having I-beam cross-sections have a reduced weight over I-beam cross-sections joined using fasteners. The illustrative embodiments recognize and take into account that unitized composite grids having I-beam cross-sections have fewer manufacturing steps than forming, curing, and fastening separate I-beam cross-sections.

The illustrative embodiments further recognize and take into account that forming unitized composite grids having I-beam cross-sections may trap tooling. Accordingly, specialized tooling for applying pressure during curing to unitized composite grids may be developed. For example, inflatable tooling, shrinking tooling, or tooling having a plurality of parts may be used as specialized tooling for applying pressure to unitized composite grids during curing. However, this specialized tooling may be more complicated than desired. Further, using the specialized tooling may take more time that desired. Yet further, the specialized tooling may have a limited number of cure cycles.

The illustrative embodiments recognize and take into account that it may be desirable to form unitized composite structures without trapping tooling. More specifically, the illustrative embodiments recognize and take into account that weight, manufacturing time, quantity of manufacturing steps, and complication of tooling may each be weighed in changing the design of a unified composite structure. Further, the illustrative embodiments recognize and take into account that weight, manufacturing time, cost, and performance characteristics may be weighed in deciding what material is used to form unified structures. Structures may be formed using at least one of a number of metals, a number of polymers, or a number of composite materials.

Figure 1:
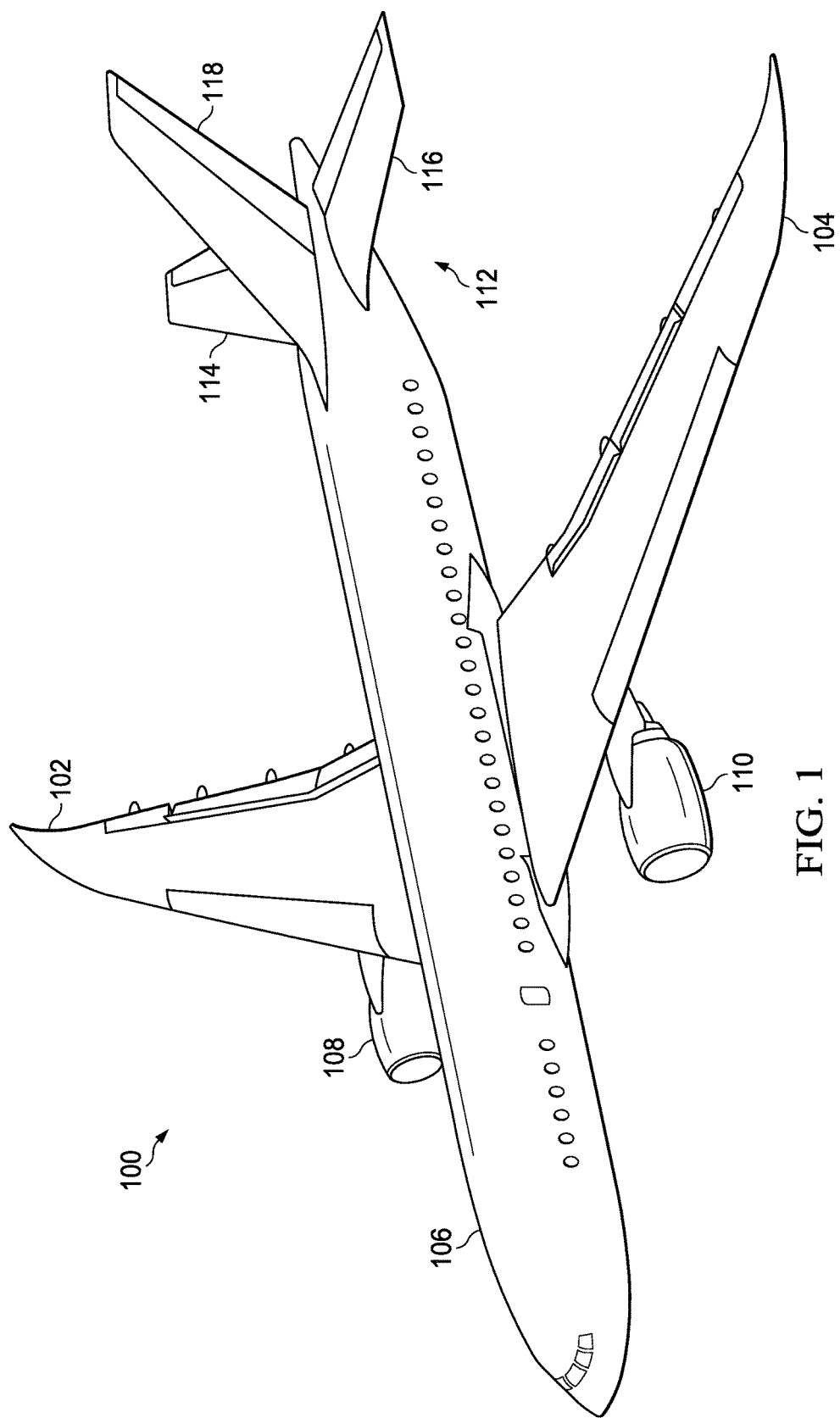
FIG. 1 is an illustration of an aircraft in which an illustrative embodiment may be implemented.

Referring now to the figures and, in particular, with reference to FIG. 1, an illustration of an aircraft is depicted in which an illustrative embodiment may be implemented. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft having structures that may be formed by joining a first unitary structure and a second unitary structure in accordance with an illustrative embodiment. For example, composite skin in body 106 may be stiffened using a composite grid formed of a first unitary structure and a second unitary structure.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, thing, or a category.

For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as a private passenger aircraft, a rotorcraft, or other suitable types of aircraft.

Although the illustrative examples for an illustrative embodiment are described with respect to an aircraft, an illustrative embodiment may be applied to other types of platforms. The platform may be, for example, a mobile platform, a stationary platform, a land-based structure, an aquatic-based structure, or a space-based structure. More specifically, the platform may be a surface ship, a tank, a personnel carrier, a train, a spacecraft, a space station, a satellite, a submarine, an automobile, a manufacturing facility, a building, or other suitable platforms.

Figure 2:
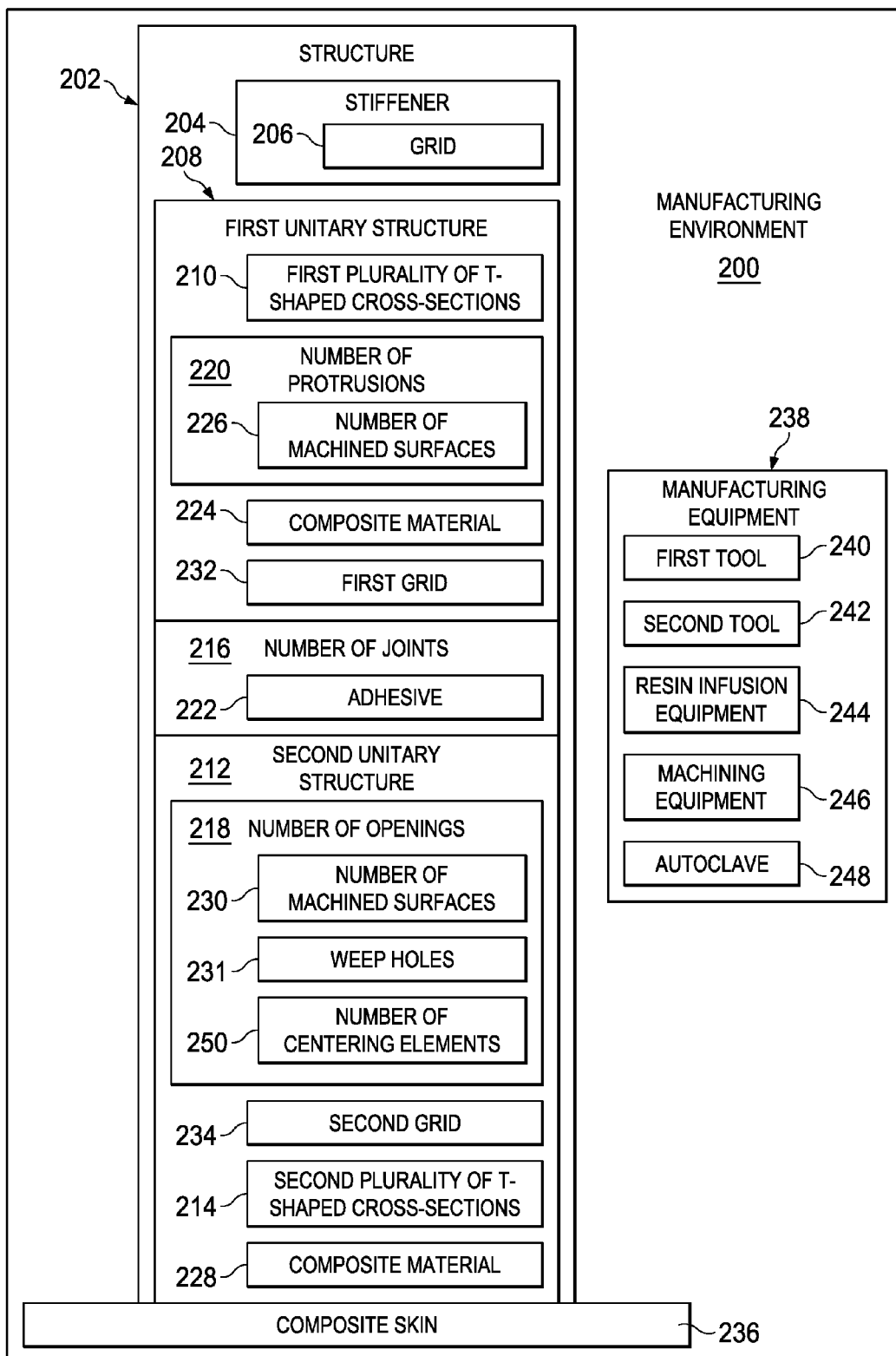
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. In this illustrative example, manufacturing environment 200 is an environment in which structures of aircraft 100 are formed.

As depicted, structure 202 takes the form of any desirable part. Structure 202 may be a composite structure of aircraft 100 of FIG. 1.

In some illustrative examples, structure 202 takes the form of stiffener 204. More specifically, in one example, stiffener 204 is grid 206. Grid 206 may be a stiffener for body 106 of aircraft 100 of FIG. 1.

Structure 202 comprises first unitary structure 208 having first plurality of T-shaped cross-sections 210, second unitary structure 212 having second plurality of T-shaped cross-sections 214, and number of joints 216 between first unitary structure 208 and second unitary structure 212.

As used herein, "a number of," when used with reference to items means one or more items. As a result, number of joints 216 includes one or more joints. In some illustrative examples, number of joints 216 is a number of Pi-joints.

Number of joints 216 includes number of openings 218 in second unitary structure 212, number of protrusions 220 in first unitary structure 208, and adhesive 222. Although number of openings 218 is associated with second unitary structure 212 in this depiction, in other examples, number of openings 218 is instead associated with first unitary structure 208. In these other examples, number of protrusions 220 is instead associated with second unitary structure 212.

In some illustrative examples, number of protrusions 220 is formed by machining composite material 224 of first unitary structure 208. When number of protrusions 220 is formed by machining, number of protrusions 220 includes number of machined surfaces 226.

In some illustrative examples, number of openings 218 is formed by machining composite material 228 of second unitary structure 212. When number of openings 218 is formed by machining, number of openings 218 includes number of machined surfaces 230.

When first unitary structure 208 is formed of composite material 224 and second unitary structure 212 is formed of composite material 228, structure 202 may be referred to as a composite structure. In some examples, one of first unitary structure 208 or second unitary structure 212 is formed of a material other than a composite material. In these examples, the non-composite material is selected to prevent undesirable interactions with the composite material of the other of first unitary structure 208 or second unitary structure 212.

Number of openings 218 also includes weep holes 231. Weep holes 231 are machined in the side of plies of composite material 228. Adhesive 222 flows through weep holes 231 during the joining of first unitary structure 208 and second unitary structure 212. Structure 202 is inspected for adhesive wetout from weep holes 231. Adhesive wetout indicates adhesive pull. Adhesive pull is when the adhesive is in contact with desired bonding surfaces. Desirable adhesive pull indicates an adequate bond.

When adhesive wetout is undesirably low, number of joints 216 may have an undesirable quality. For example, when adhesive wetout is undesirably low, number of joints 216 may lack the mechanical strength to form first unitary structure 208.

When structure 202 is grid 206, first unitary structure 208 is first grid 232 and second unitary structure 212 is second grid 234. First grid 232 and second grid 234 are joined to form grid 206.

Composite skin 236 is bonded directly to one of first unitary structure 208 or second unitary structure 212. More specifically, in some examples, composite skin 236 is co-cured with one of first unitary structure 208 or second unitary structure 212. As depicted, composite skin 236 is directly bonded to second unitary structure 212. In some illustrative examples, first unitary structure 208, second unitary structure 212, and composite skin 236 form a component of an aircraft, such as aircraft 100 of FIG. 1.

Structure 202 is formed using manufacturing equipment 238. As depicted, manufacturing equipment 238 includes first tool 240, second tool 242, resin infusion equipment 244, machining equipment 246, and autoclave 248.

In some examples, using resin infusion equipment 244, rather than prepreg composite materials, creates first unitary structure 208 and second unitary structure 212 with desirable characteristics. In these examples, resin infusion equipment 244 infuses resin into dry preforms instead of using prepreg composite materials. For example, using resin infusion equipment 244 provides desirable tolerances for first unitary structure 208 and second unitary structure 212. Desirable tolerances include tolerances for first unitary structure 208 and second unitary structure 212 such that first unitary structure 208 and second unitary structure 212 may be joined. More specifically, the dimensions of resin infusion equipment 244 are well-controlled, and as a result, create well-controlled tolerances for first unitary structure 208 and second unitary structure 212.

Composite material 224 is formed by resin infusing dry fiber material using resin infusion equipment 244. More specifically, resin infusion equipment 244 resin infuses a first dry structure to form an infused first structure. After forming composite material 224, composite material 224 is cured using first tool 240 and autoclave 248. More specifically, the infused first structure is cured to form first unitary structure 208. After curing, first tool 240 is removed from first unitary structure 208. First plurality of T-shaped cross-sections 210 allows for removal of first tool 240.

First tool 240 is a rigid tool used to apply equal pressure to composite material 224 during curing. First plurality of T-shaped cross-sections 210 are co-cured to form first grid 232. First tool 240 is formed of any desirable material. In one illustrative example, first tool 240 is formed of a metal.

Composite material 228 is formed by resin infusing dry fiber material using resin infusion equipment 244. More specifically, resin infusion equipment 244 resin infuses a second dry structure to form an infused second structure. After forming composite material 228, composite material 228 is cured using second tool 242 and autoclave 248. More specifically, the infused second structure is cured to form second unitary structure 212. After curing, second tool 242 is removed from second unitary structure 212. Second plurality of T-shaped cross-sections 214 allows for removal of second tool 242.

Second tool 242 is a rigid tool used to apply equal pressure to composite material 228 during curing. Second plurality of T-shaped cross-sections 214 are co-cured to form second grid 234. Second tool 242 is formed of any desirable material. In one illustrative example, second tool 242 is formed of a metal.

As depicted, composite skin 236 is directly bonded to second unitary structure 212. In some examples, a composite skin layup is co-cured with the infused second structure to form composite skin 236 bonded to second unitary structure 212.

After forming first unitary structure 208 and second unitary structure 212, first unitary structure 208 and second unitary structure 212 are prepared for joining. Preparing first unitary structure 208 and second unitary structure 212 for joining includes forming at least one of number of protrusions 220 or number of openings 218.

In some examples, number of protrusions 220 are present in the first dry structure. In these examples, number of protrusions 220 are formed prior to curing. In other examples, at least a portion of number of protrusions 220 are formed using machining equipment 246. Number of protrusions 220 are machined such that first unitary structure 208 and second unitary structure 212 are within tolerances for joining.

Number of openings 218 are formed using machining equipment 246. Number of openings 218 may have any desirable shape or size such that a desirable amount of adhesive 222 is present.

Further, number of openings 218 optionally includes number of centering elements 250. Number of centering elements 250 centers number of protrusions 220 within number of openings 218. By centering number of protrusions 220 within number of openings 218, bond line thickness is controlled. Controlling bond line thickness affects structural capability of structure 202.

Number of centering elements 250 takes the form of any desirable components. When number of centering elements 250 is present, the walls of number of openings 218 are not planar. In some examples, number of centering elements 250 includes at least one of bumps, dimples, channels, protrusions, or other physical structures. In some examples, number of centering elements 250 is integral to number of openings 218. For example, number of centering elements 250 is formed from the material of second unitary structure 212. In other examples, number of centering elements 250 is formed from a different material added to second unitary structure 212.

The illustration of manufacturing environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although not depicted in manufacturing environment 200 of FIG. 2, manufacturing equipment 238 may further include non-destructive inspection equipment. Non-destructive inspection equipment may be used to further inspect any desirable portion of structure 202, such as number of joints 216, first unitary structure 208, or second unitary structure 212.

As another example, although first unitary structure 208 is described as being formed of composite material 224 and second unitary structure 212 is described as being formed of composite material 228, at least one of first unitary structure 208 or second unitary structure 212 may be formed of a material other than a composite material. In some examples, at least one of first unitary structure 208 or second unitary structure 212 is formed of a polymeric material, a metal, or some other desirable non-composite material. In these examples, manufacturing equipment 238 includes additional equipment such as additive manufacturing equipment, injection equipment, molding equipment, or any other desirable type of equipment.

As yet a further example, at least one of composite material 224 or composite material 228 is formed of a prepreg material. In this example, manufacturing equipment 238 includes desirable equipment to place the prepreg material such as at least one of pick and place equipment, a composite tape laying head, or other desirable equipment.

Figure 3:
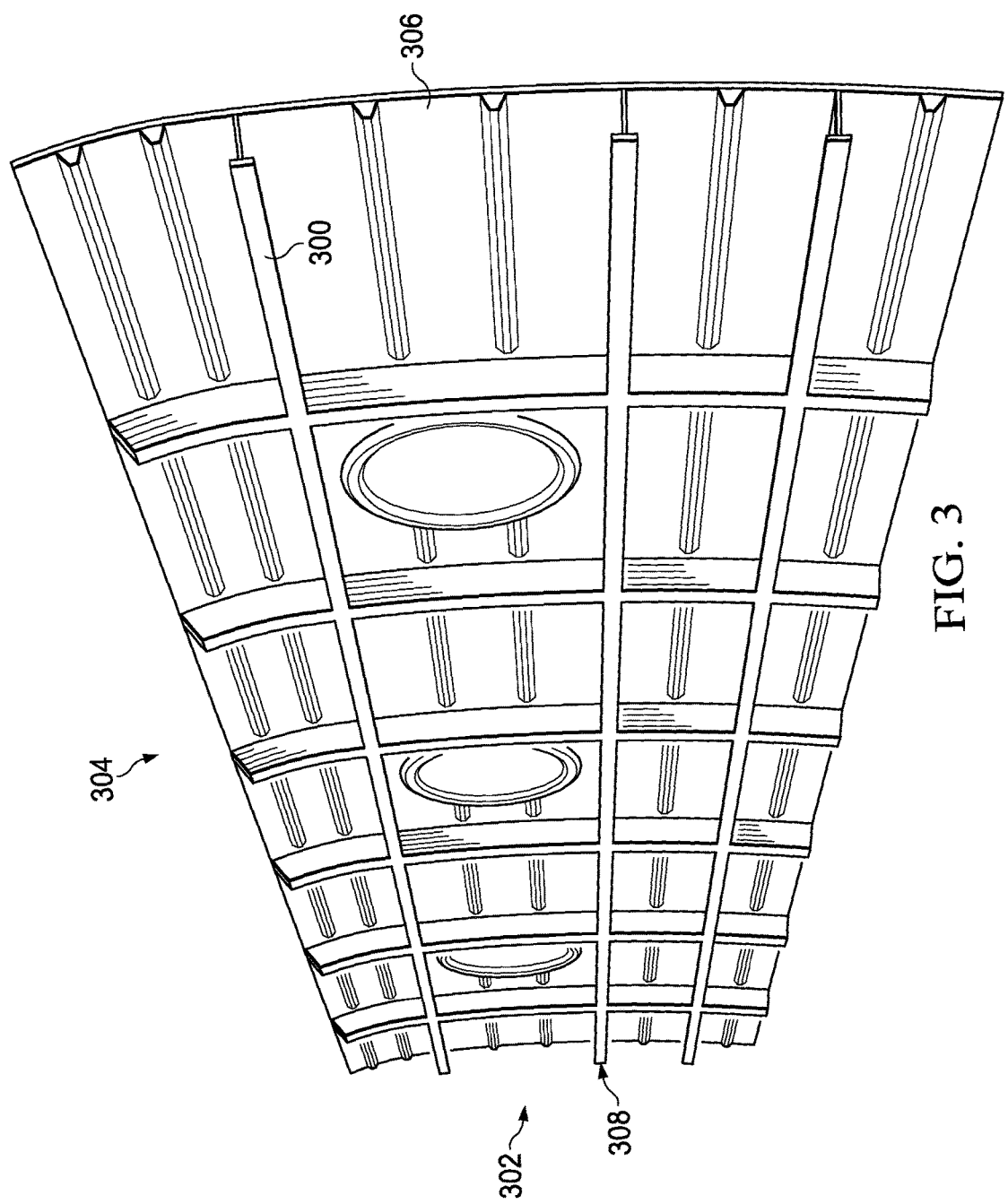
FIG. 3 is an illustration of a fuselage having a number of unitized structures in accordance with an illustrative embodiment.

Turning now to FIG. 3, an illustration of a fuselage having a number of unitized structures is depicted in accordance with an illustrative embodiment. Stiffener 300 of fuselage 302 is a physical implementation of structure 202 of FIG. 2. Further, view 304 of fuselage 302 may be an interior view of body 106 of FIG. 1.

Fuselage 302 includes composite skin 306 and stiffener 300. As depicted, stiffener 300 takes the form of grid 308. Grid 308 may be a physical implementation of grid 206 of FIG. 2.

Figure 4:
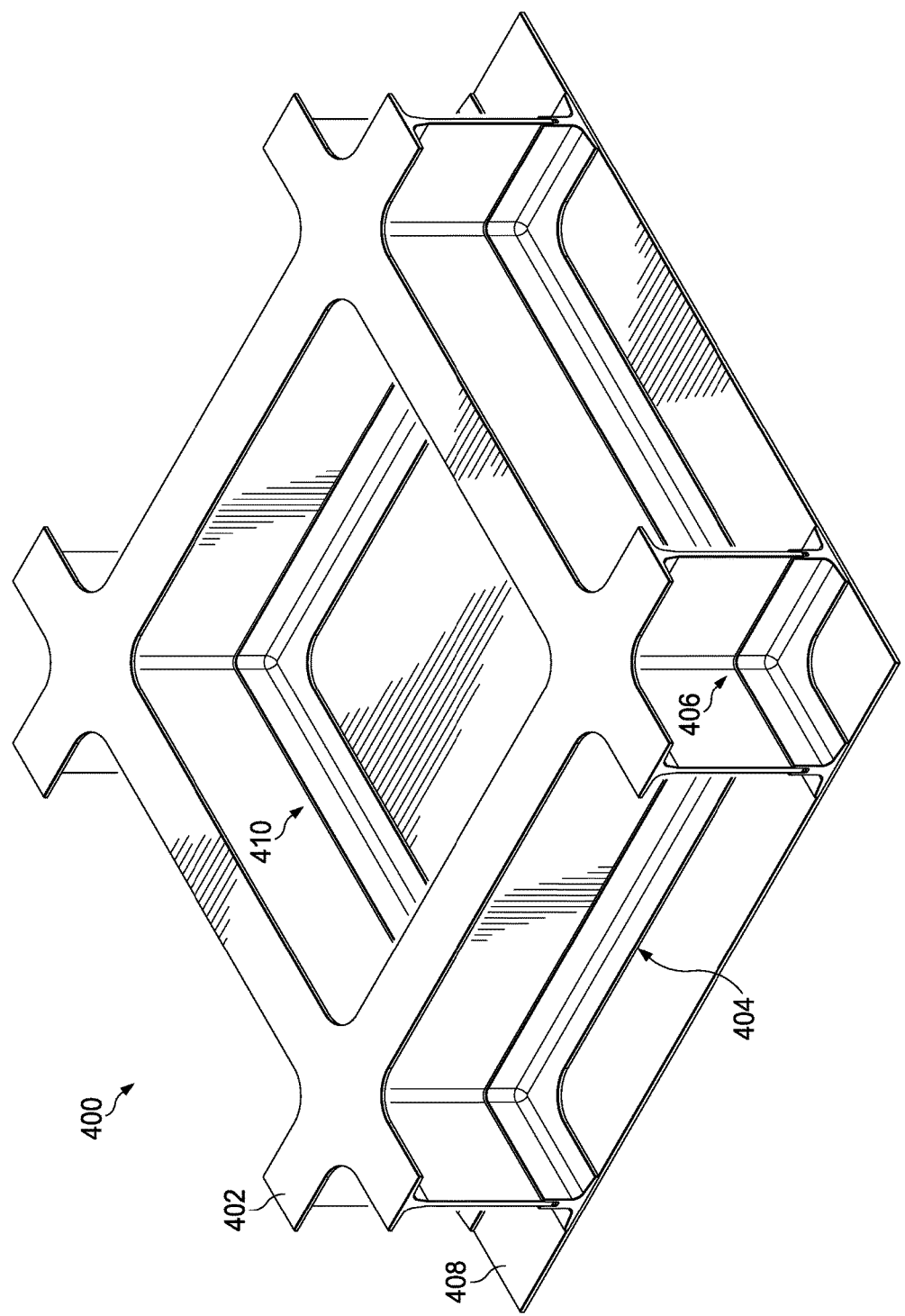
FIG. 4 is an illustration of a structure formed by joining two unitized structures in accordance with an illustrative embodiment.

Turning now to FIG. 4, an illustration of a structure formed by joining two unitized structures is depicted in accordance with an illustrative embodiment. Structure 400 is a physical implementation of structure 202 of FIG. 2. In some examples, structure 400 is a portion of stiffener 300 of FIG. 3.

Structure 400 includes first unitary structure 402, second unitary structure 404, and number of joints 406. Second unitary structure 404 is directly bonded to composite skin 408.

If structure 400 was cured as one piece, a tool would be trapped within cavity 410. However, by forming and curing first unitary structure 402 and second unitary structure 404 separately, tooling is not trapped within cavity 410.

Figure 5:
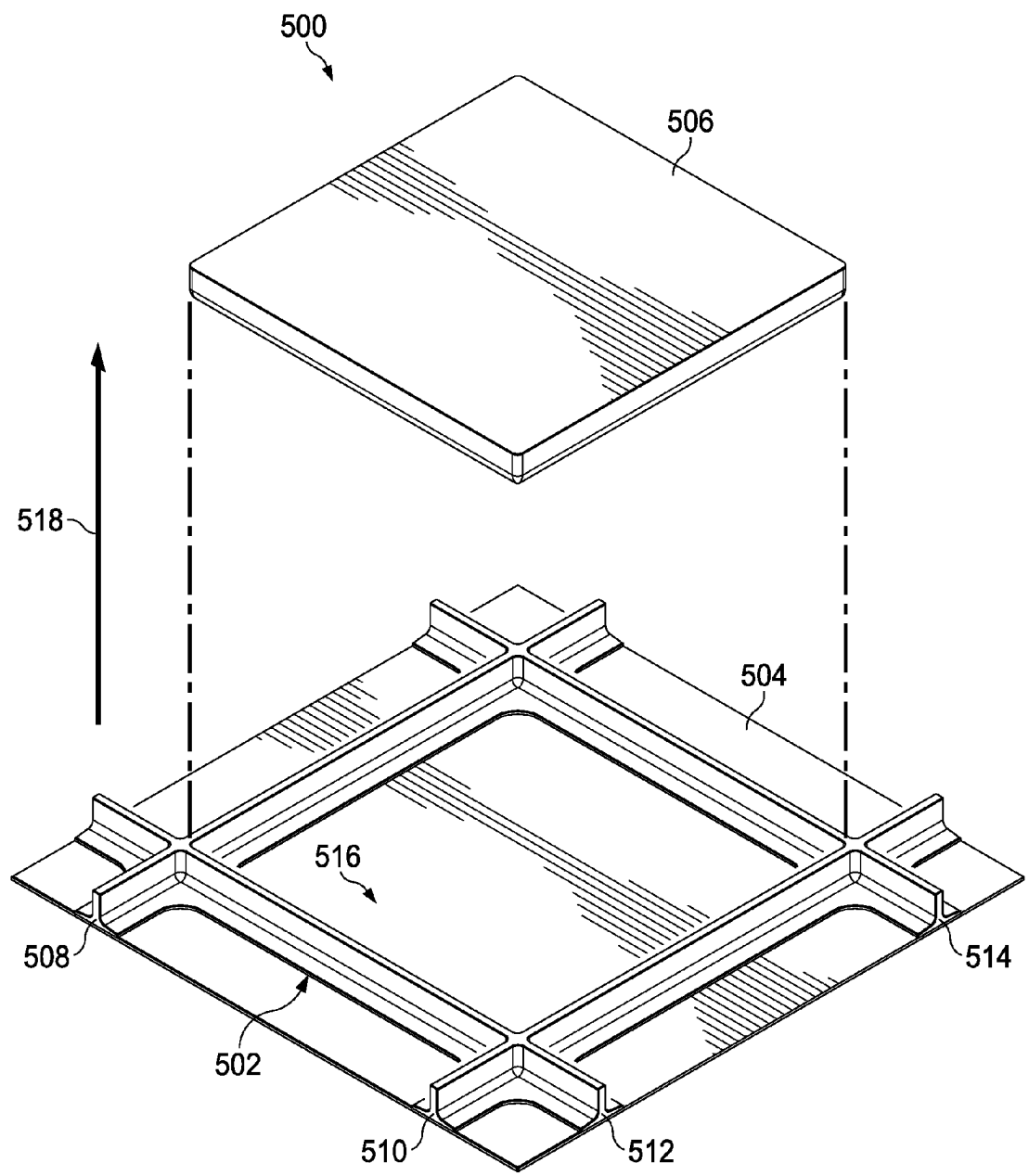
FIG. 5 is an illustration of a forming tool, a second unitary structure, and composite skin in accordance with an illustrative embodiment.

Turning now to FIG. 5, an illustration of a tool, a second unitary structure, and composite skin is depicted in accordance with an illustrative embodiment. Manufacturing environment 500 may be a physical implementation of manufacturing environment 200 of FIG. 2. Manufacturing environment 500 includes second unitary structure 502, composite skin 504, and tool 506. As depicted, tool 506 is removed from second unitary structure 502 after second unitary structure 502 is cured. In this example, second unitary structure 502 and composite skin 504 are co-cured. By co-curing second unitary structure 502 and composite skin 504, composite skin 504 is directly bonded to second unitary structure 502.

Second unitary structure 502 has a plurality of T-shaped cross-sections including T-shaped cross-section 508, T-shaped cross-section 510, T-shaped cross-section 512, and T-shaped cross-section 514. Due to the plurality of T-shaped cross-sections, tool 506 is not trapped within cavity 516 of second unitary structure 502. Tool 506 is removed from second unitary structure 502 by moving tool 506 in direction 518.

After removing tool 506, portions of second unitary structure 502 are machined. For example, after removing tool 506, a number of openings is machined into T-shaped cross-section 508, T-shaped cross-section 510, T-shaped cross-section 512, and T-shaped cross-section 514. The number of openings receives a number of protrusions from a first unitary structure.

Figure 6:
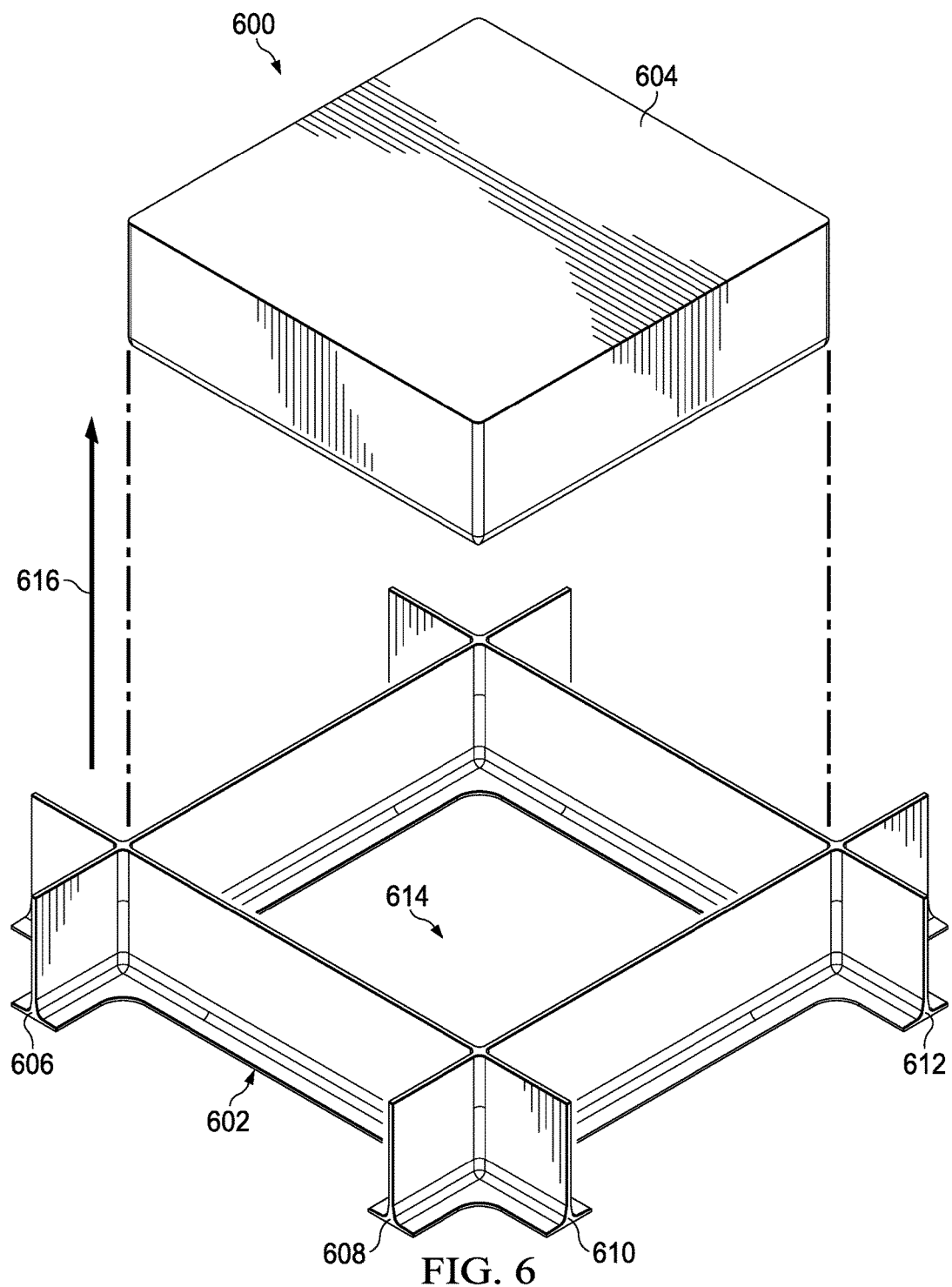
FIG. 6 is an illustration of a forming tool and a first unitary structure in accordance with an illustrative embodiment.

Turning now to FIG. 6, an illustration of a forming tool and a first unitary structure is depicted in accordance with an illustrative embodiment. Manufacturing environment 600 may be a physical implementation of manufacturing environment 200 of FIG. 2. In some examples, manufacturing environment 600 is the same as manufacturing environment 500 of FIG. 5. Manufacturing environment 600 includes first unitary structure 602 and tool 604. As depicted, tool 604 is removed from first unitary structure 602 after first unitary structure 602 is cured.

First unitary structure 602 has a plurality of T-shaped cross-sections including T-shaped cross-section 606, T-shaped cross-section 608, T-shaped cross-section 610, and T-shaped cross-section 612. Due to the plurality of T-shaped cross-sections, tool 604 is not trapped within cavity 614 of first unitary structure 602. Tool 604 is removed from first unitary structure 602 by moving tool 604 in direction 616.

In some examples, after removing tool 604, portions of first unitary structure 602 are machined. For example, after removing tool 604, a number of protrusions is machined into T-shaped cross-section 606, T-shaped cross-section 608, T-shaped cross-section 610, and T-shaped cross-section 612. In other examples, first unitary structure 602 is not machined. In these examples, the number of protrusions is part of the shape of first unitary structure 602 prior to curing. After forming, the number of protrusions is inserted into the number of openings of second unitary structure 502.

Figure 7:
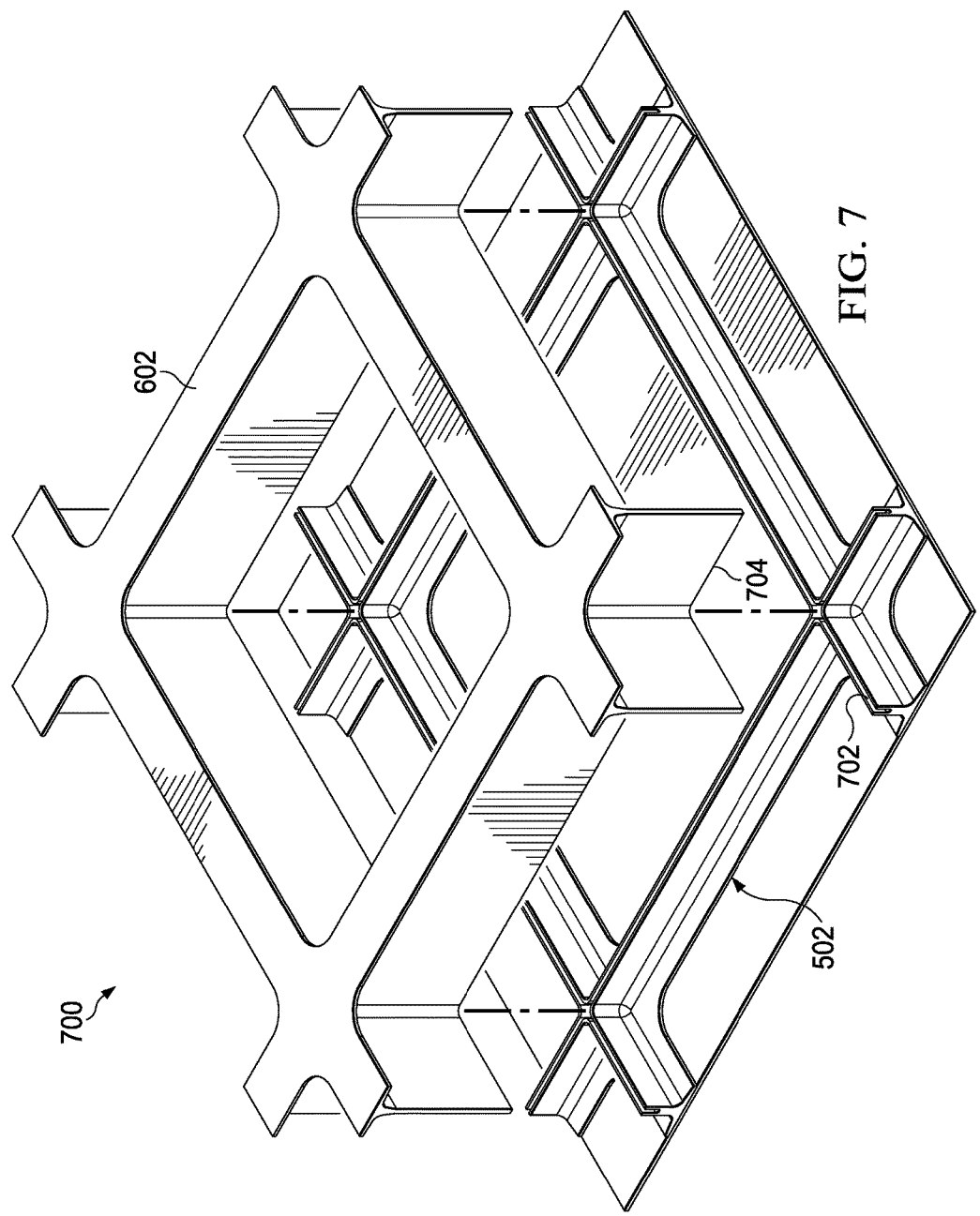
FIG. 7 is an illustration of a first unitary structure positioned relative to a second unitary structure in accordance with an illustrative embodiment.

Turning now to FIG. 7, an illustration of a first unitary structure positioned relative to a second unitary structure is depicted in accordance with an illustrative embodiment. In view 700, first unitary structure 602 has been rotated 180 degrees from the view of FIG. 6. First unitary structure 602 is positioned over second unitary structure 502 of FIG. 5. To form a structure, such as structure 202 of FIG. 2, adhesive is applied to number of openings 702 in secondary unitary structure 502. After applying adhesive to the number of openings 702, number of protrusions 704 of first unitary structure 602 is inserted into number of openings 702. Inserting number of protrusions 704 into number of openings 702 forms number of joints 406 of structure 400 of FIG. 4.

Figure 8:
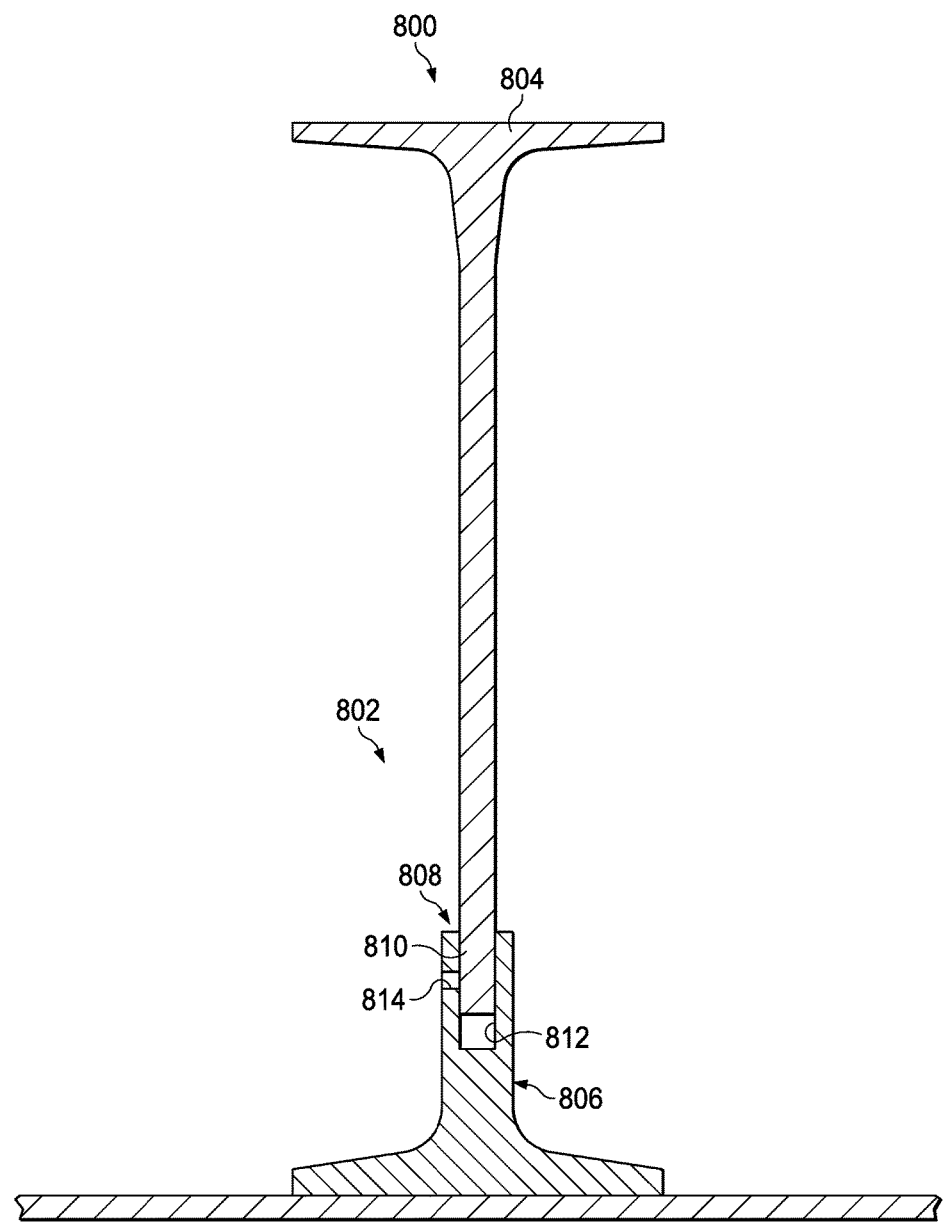
FIG. 8 is an illustration of a cross-sectional view of a joint between a first unitary structure and a second unitary structure in accordance with an illustrative embodiment.

Turning now to FIG. 8, an illustration of a cross-sectional view of a joint between a first unitary structure and a second unitary structure is depicted in accordance with an illustrative embodiment. View 800 is a cross-sectional view of a portion of a structure, such as structure 400 of FIG. 4.

Structure 802 of view 800 includes first unitary structure 804, second unitary structure 806, and joint 808. First unitary structure 804 has protrusion 810. Second unitary structure 806 has opening 812. At least one of protrusion 810 or opening 812 is machined. By machining at least one of protrusion 810 or opening 812, first unitary structure 804 and second unitary structure 806 are within tolerance for joining.

As depicted, weephole 814 is machined into second unitary structure 806. Weephole 814 allows for adhesive wetout from opening 812. Adhesive wetout is visible from weephole 814. Observing adhesive wetout from weephole 814 allows for inspection of joint 808 without use of inspection equipment.

Joint 808 is positioned in a web portion of structure 802. The location of joint 808 within the web portion may be positioned at any desirable height of structure 802. Joint 808 can be placed at or near the neutral axis of the web portion to minimize shear loads from bending moments of the I-shaped cross-section of structure 802.

As depicted, weephole 814 is machined into second unitary structure 806 in only one side. However, in other examples, weephole 814 may be machined through both sides of opening 812 of second unitary structure 806. Further, in other examples, weephole 814 may be desirably machined into the opposite side of second unitary structure 806 instead.

Figure 9:
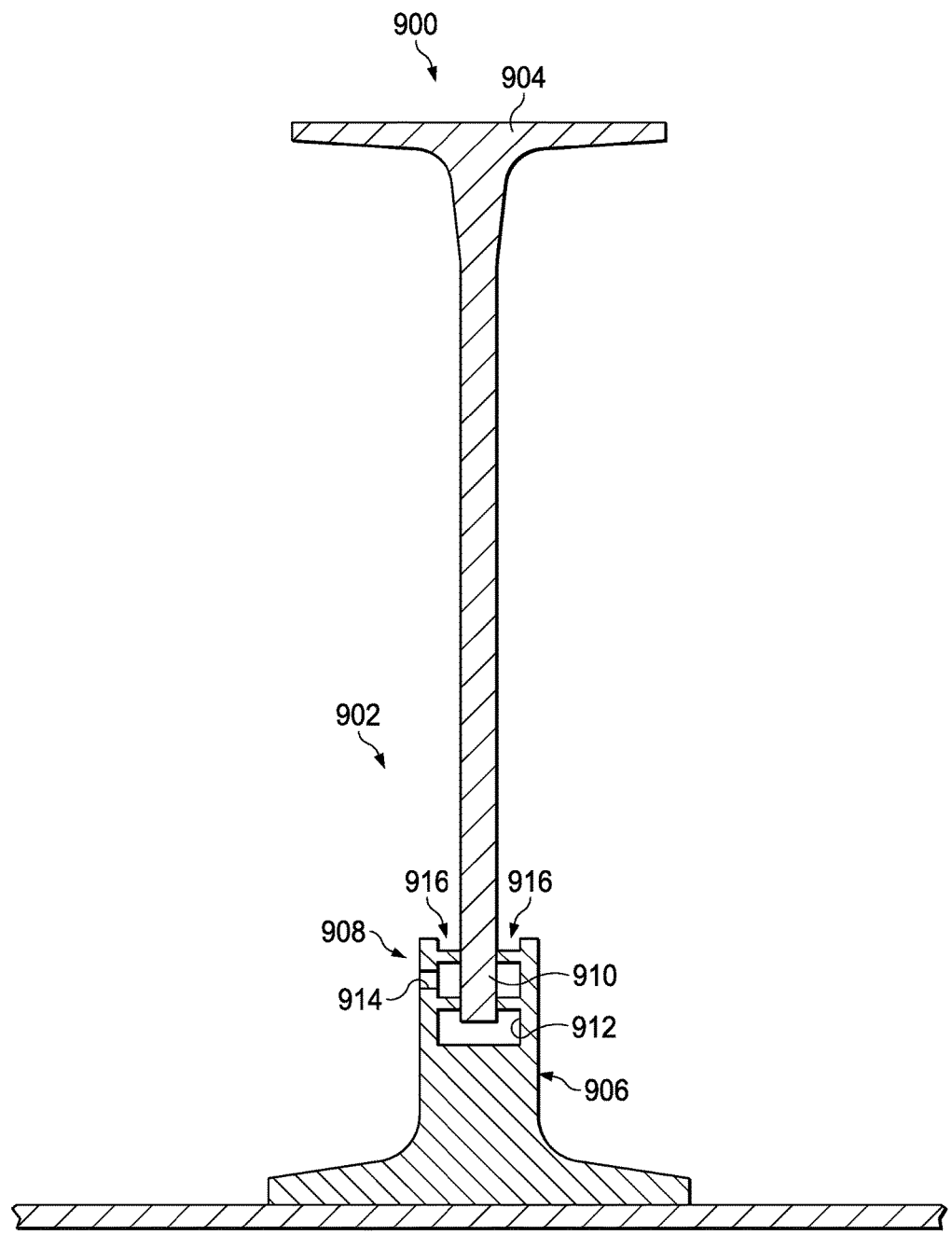
FIG. 9 is an illustration of a cross-sectional view of a joint between a first unitary structure and a second unitary structure in accordance with an illustrative embodiment.

Turning now to FIG. 9, an illustration of a cross-sectional view of a joint between a first unitary structure and a second unitary structure is depicted in accordance with an illustrative embodiment. View 900 is a cross-sectional view of a portion of a structure, such as structure 400 of FIG. 4.

Structure 902 of view 900 includes first unitary structure 904, second unitary structure 906, and joint 908. First unitary structure 904 has protrusion 910. Second unitary structure 906 has opening 912. In some examples, at least one of protrusion 910 or opening 912 is machined. By machining at least one of protrusion 910 or opening 912, first unitary structure 904 and second unitary structure 906 are within tolerance for joining.

As depicted, weephole 914 is machined into second unitary structure 906. Weephole 914 allows for adhesive wetout from opening 912. Adhesive wetout is visible from weephole 914. Observing adhesive wetout from weephole 914 allows for inspection of joint 908 without use of inspection equipment.

Joint 908 is positioned in a web portion of structure 902. The location of joint 908 within the web portion may be positioned at any desirable height of structure 902. Joint 908 can be placed at or near the neutral axis of the web portion to minimize shear loads from bending moments of the I-shaped cross-section of structure 902.

As depicted, weephole 914 is machined into second unitary structure 906 in only one side. However, in other examples, weephole 914 may be machined through both sides of opening 912 of second unitary structure 906. Further, in other examples, weephole 914 may be desirably machined into the opposite side of second unitary structure 906 instead.

In this depicted example, opening 912 includes number of centering elements 916. Number of centering elements 916 center protrusion 910 within opening 912. As depicted, number of centering elements 916 are a number of bumps. In other examples, number of centering elements 916 may take the form of dimples, channels, protrusions, or other nonplanar elements.

Figure 10:
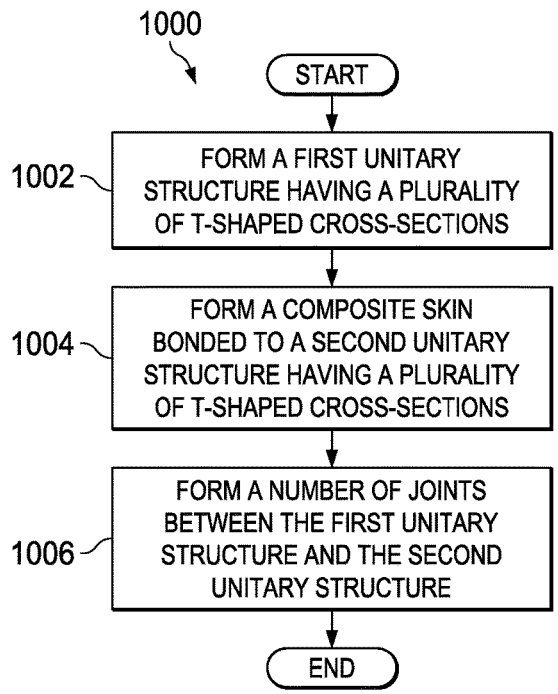
FIG. 10 is an illustration of a flowchart of a process for forming a structure in accordance with an illustrative embodiment

Turning now to FIG. 10, an illustration of a flowchart of a process for forming a structure is depicted in accordance with an illustrative embodiment. Process 1000 may be implemented in manufacturing environment 200 of FIG. 2 to form structure 202 of FIG. 2. Structure 400 of FIG. 4 may be formed using process 1000. Process 1000 may be implemented to form structures of aircraft 100 of FIG. 1.

Process 1000 forms a first unitary structure having a plurality of T-shaped cross-sections (operation 1002). In some examples, forming the first unitary structure comprises resin infusing a first dry structure to form an infused first structure; and curing the infused first structure to form the first unitary structure.

Process 1000 forms a composite skin bonded to a second unitary structure having a plurality of T-shaped cross-sections (operation 1004). In some examples, forming the composite skin bonded to the second unitary structure comprises resin infusing a second dry structure to form an infused second structure; and curing the infused second structure to form the second unitary structure. In some examples, forming the composite skin bonded to the second unitary structure further comprises co-curing a composite skin layup and the infused second structure to form the composite skin bonded to the second unitary structure.

Process 1000 forms a number of joints between the first unitary structure and the second unitary structure (operation 1006). In some examples, forming the number of joints between the first unitary structure and the second unitary structure comprises applying an adhesive to a number of openings in the second unitary structure, and inserting a number of protrusions of the first unitary structure into the number of openings.

Figure 11:
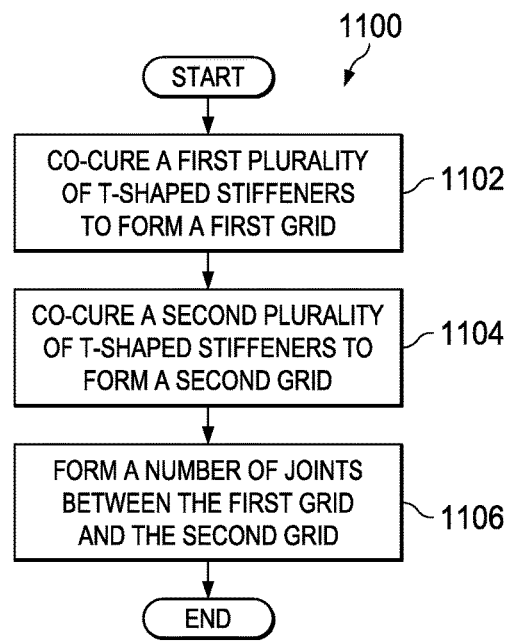
FIG. 11 is an illustration of a flowchart of a process for forming a structure in accordance with an illustrative embodiment.

Turning now to FIG. 11, an illustration of a flowchart of a process for forming a composite structure is depicted in accordance with an illustrative embodiment. Process 1100 may be implemented in manufacturing environment 200 of FIG. 2 to form structure 202 of FIG. 2. Structure 400 of FIG. 4 may be formed using process 1100. Process 1100 may be implemented to form composite structures of aircraft 100 of FIG. 1.

Process 1100 co-cures a first plurality of T-shaped stiffeners to form a first grid (operation 1102). Process 1100 also co-cures a second plurality of T-shaped stiffeners to form a second grid (operation 1104).

Process 1100 then forms a number of joints between the first grid and the second grid (operation 1106). Afterwards, the process terminates. In some examples, forming the number of joints comprises applying adhesive to a number of openings of the second grid; and inserting a number of protrusions of the first grid into the number of openings of the second grid.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

In one example, process 1000 further comprises machining the second unitary structure to form the number of openings. In one example, process 1000 further comprises machining weep holes into the number of openings.

In some examples, process 1100 further comprises machining weep holes into the second grid, and determining an amount of adhesive wetout from the weep holes. In some examples, process 1100 further comprises machining the number of openings into the second grid. In some examples, process 1100 further comprises machining the first grid to form the number of protrusions. In some examples, process 1100 further comprises co-curing a composite skin to at least one of the first grid or the second grid.

Figure 12:
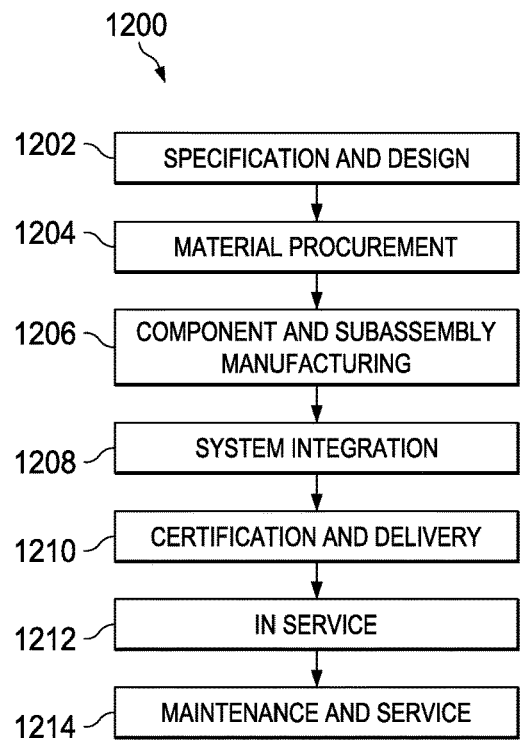
FIG. 12 is an illustration of an aircraft manufacturing and service method in the form of a block diagram in accordance with an illustrative embodiment.
Figure 13:
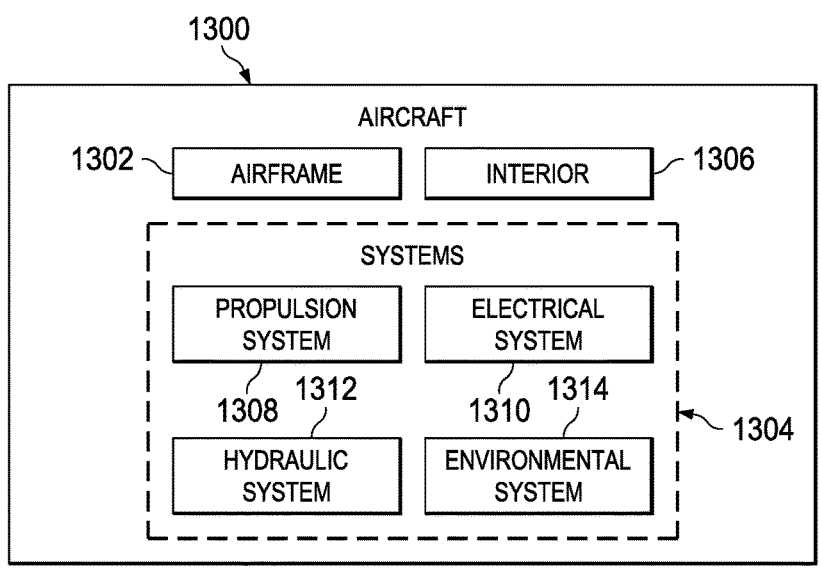
FIG. 13 is an illustration of an aircraft in the form of a block diagram in which an illustrative embodiment may be implemented.

The illustrative embodiments of the disclosure may be described in the context of aircraft manufacturing and service method 1200 as shown in FIG. 12 and aircraft 1300 as shown in FIG. 13. Turning first to FIG. 12, an illustration of an aircraft manufacturing and service method is depicted in accordance with an illustrative embodiment. During preproduction, aircraft manufacturing and service method 1200 may include specification and design 1202 of aircraft 1300 in FIG. 13 and material procurement 1204.

During production, component and subassembly manufacturing 1206 and system integration 1208 of aircraft 1300 takes place. Thereafter, aircraft 1300 may go through certification and delivery 1210 in order to be placed in service 1212. While in service 1212 by a customer, aircraft 1300 is scheduled for routine maintenance and service 1214, which may include modification, reconfiguration, refurbishment, and other maintenance or service.

Each of the processes of aircraft manufacturing and service method 1200 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 13, an illustration of an aircraft is depicted in which an illustrative embodiment may be implemented. In this example, aircraft 1300 is produced by aircraft manufacturing and service method 1200 in FIG. 12 and may include airframe 1302 with plurality of systems 1304 and interior 1306. Examples of systems 1304 include one or more of propulsion system 1308, electrical system 1310, hydraulic system 1312, and environmental system 1314. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1200 in FIG. 12. One or more illustrative embodiments may be used during component and subassembly manufacturing 1206. For example, manufacturing environment 200 in FIG. 2 may be used during component and subassembly manufacturing 1206. Specifically, structure 202 in FIG. 2 may be assembled during component and subassembly manufacturing 1206. For example, process 1000 of FIG. 10 or process 1100 of FIG. 11 may be used during component and subassembly manufacturing 1206 to form a portion of aircraft 1300. Further, structure 202 may also be used to perform replacements and upgrades during maintenance and service 1214.

The illustrative embodiments provide a method and apparatus for forming a structure. The structure comprises a first unitary structure having a plurality of T-shaped cross-sections; a second unitary structure having a plurality of T-shaped cross-sections; and a number of joints between the first unitary structure and the second unitary structure. More specifically, the plurality of T-shaped cross-sections of the first unitary structure and the plurality of T-shaped cross-sections of the second unitary structure are joined to form an I-shaped cross-section for the structure.

The number of joints is positioned in any desirable location within a web of the structure. In some examples, the number of joints is positioned at or near the neutral axis of the web to minimize shear loads from the bending moments of the beams.

By forming the first unitary structure and second unitary structure separately, forming tools may be removed from the first unitary structure and second unitary structure after curing. The first unitary structure and the second unitary structure both have open ends to allow for removal of tools in respective cavities during curing.

The illustrative embodiments recognize and take into account that tolerances of square or grid shaped structures affects the joining of the structures. Small differences in one or more portions of square or grid shaped structures may prevent the square or grid shaped structures from being joined.

Resin infusion of dry preforms provides better tolerances than laying up pre-impregnated composite materials. As a result, first unitary structure and second unitary structure are formed by resin infusion. By forming first unitary structure and second unitary structure by resin infusion, the tolerances may be acceptable to join first unitary structure and second unitary structure.

Further, the number of joints is formed by a number of machined surfaces. At least one of a number of openings or a number of protrusions of the number of joints is formed by machining. The machined surfaces are within tolerance for joining. By machining surfaces, some inconsistencies in size or shape of first unitary structure or second unitary structure may be removed or compensated for through machining.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus that comprises:
 a first unitary structure comprising a first plurality of T-shaped cross-sections;
 a second unitary structure comprising a second plurality of T-shaped cross-sections; and
 I-shaped cross sections formed by a number of joints between the first unitary structure and the second unitary structure, such that the number of joints comprise:
  a height, above a shorter section of the second plurality of T-shaped cross sections in the second unitary structure, configured to control a shear load from a bending moment of the I-shaped cross sections;
  a number of openings in a center of a longer section of the T-shaped cross sections of the second unitary structure configured to receive a number of protrusions of the first unitary structure; and
  adhesive within the number of openings.

2. The apparatus of claim 1 further comprising:
 a composite skin bonded directly to one of the first unitary structure or the second unitary structure.

3. The apparatus of claim 1, wherein the number of openings includes a number of machined surfaces.

4. The apparatus of claim 1, wherein the number of openings includes weep holes.

5. The apparatus of claim 1, wherein the first unitary structure is a grid.

6. The apparatus of claim 5, wherein the second unitary structure is a second grid.

7. The apparatus of claim 2, wherein the first unitary structure, the second unitary structure and the composite skin form a component of an aircraft.

8. A method comprising:
forming a first unitary structure comprising a first plurality of T-shaped cross-sections;
curing a composite skin to a second unitary structure, comprising a second plurality of T-shaped cross-sections, along a shorter section of the second plurality of T-shaped cross-sections;
forming I-shaped cross-sections via joining the first unitary structure and the second unitary structure via forming a number of joints between the first unitary structure and the second unitary structure via applying an adhesive to a number of openings in a center of a longer section of the second plurality of T-shaped cross-sections of the second unitary structure and inserting a number of protrusions of the first unitary structure into the number of openings; and
controlling a shear load from a bending moment of the I-shaped cross sections via a height, above a shorter section of the second plurality of T-shaped cross sections in the second unitary structure, of the number of joints.

9. The method of claim 8, wherein forming the first unitary structure comprises:
resin infusing a first dry structure to form an infused first structure; and
curing the infused first structure to form the first unitary structure.

10. The method of claim 8, wherein forming the composite skin bonded to the second unitary structure comprises:
resin infusing a second dry structure to form an infused second structure; and
curing the infused second structure to form the second unitary structure.

11. The method of claim 10, wherein forming the composite skin bonded to the second unitary structure further comprises:
co-curing a composite skin layup and the infused second structure to form the composite skin bonded to the second unitary structure.

12. The method of claim 8 further comprising:
machining the second unitary structure to form the number of openings.

13. The method of claim 8 further comprising:
machining weep holes into the number of openings.

14. A method comprising:
co-curing a first plurality of T-shaped stiffeners to form a first grid;
co-curing a second plurality of T-shaped stiffeners to form a second grid; and
forming I-shaped cross sections via combining the first plurality of T-shaped stiffeners with the second plurality of T-shaped stiffeners via forming a number of joints between the first grid and the second grid via applying an adhesive to a number of openings in a center of a longer section of the second plurality of T-shaped cross-sections of the second grid and inserting a number of protrusions of the first grid into the number of openings of the second grid, the joint comprising a height, above a shorter section of the second plurality of T-shaped cross sections in a unitary structure, controlling a shear load from a bending moment in the I-shaped cross sections.

15. The method of claim 14 further comprising:
machining weep holes into the second grid; and
determining an amount of adhesive wetout from the weep holes.

16. The method of claim 14 further comprising:
machining the number of openings into the second grid.

17. The method of claim 14 further comprising:
machining the first grid to form the number of protrusions.

18. The method of claim 14 further comprising:
co-curing a composite skin to at least one of the first grid or the second grid.

* * * * *

UNITED STATES PATENT AND TRADEMARK OFFICE
CERTIFICATE OF CORRECTION

PATENT NO. : 10,207,788 B2  
APPLICATION NO. : 15/096694  
DATED : February 19, 2019  
INVENTOR(S) : Ludin et al.

Page 1 of 1

It is certified that error appears in the above-identified patent and that said Letters Patent is hereby corrected as shown below:

In the Claims

Column 14,  
Claim 14, Lines 11-12, herein change "T-shaped cross-sections" to read --T-shaped stiffeners--  
Claim 14, Line 16, herein change "T-shaped cross-sections" to read --T-shaped stiffeners--

Signed and Sealed this  
Fourteenth Day of May, 2019

Andrei Iancu  
*Director of the United States Patent and Trademark Office*